United States Patent
Huang et al.

(10) Patent No.: US 12,287,234 B2
(45) Date of Patent: Apr. 29, 2025

(54) DISTRIBUTED ACOUSTIC SENSING SENSITIVITY ENHANCEMENT USING MIMO SAMPLING AND PHASE RECOMBINATION

(71) Applicant: NEC Laboratories America, Inc., Princeton, NJ (US)

(72) Inventors: Yue-Kai Huang, Princeton, NJ (US); Ezra Ip, West Windsor, NJ (US)

(73) Assignee: NEC Corporation, Tokyo (JP)

( * ) Notice: Subject to any disclaimer, the term of this patent is extended or adjusted under 35 U.S.C. 154(b) by 216 days.

(21) Appl. No.: 17/964,899

(22) Filed: Oct. 12, 2022

(65) Prior Publication Data

US 2023/0122262 A1    Apr. 20, 2023

Related U.S. Application Data

(60) Provisional application No. 63/256,002, filed on Oct. 15, 2021.

(51) Int. Cl.
*G01H 9/00* (2006.01)

(52) U.S. Cl.
CPC .................. *G01H 9/004* (2013.01)

(58) Field of Classification Search
CPC ...................................... G01H 9/004
See application file for complete search history.

(56) References Cited

U.S. PATENT DOCUMENTS

| | | | |
|---|---|---|---|
| 2012/0111104 A1* | 5/2012 | Taverner | G01H 9/004 73/152.16 |
| 2015/0318920 A1* | 11/2015 | Johnston | H04B 10/25 398/29 |
| 2016/0116331 A1* | 4/2016 | Taverner | G02B 6/02395 385/13 |
| 2018/0052102 A1* | 2/2018 | Yaman | G01H 9/004 |
| 2019/0226908 A1* | 7/2019 | Rao | G02B 6/4208 |
| 2020/0292727 A1* | 9/2020 | Hveding | G01V 8/16 |
| 2020/0370950 A1* | 11/2020 | Ip | G01B 9/02015 |
| 2021/0314063 A1* | 10/2021 | Huang | G02B 6/022 |
| 2022/0321214 A1* | 10/2022 | Huang | G02B 6/022 |

* cited by examiner

*Primary Examiner* — David J Bolduc
(74) *Attorney, Agent, or Firm* — Joseph Kolodka (57) ABSTRACT

Aspects of the present disclosure describe distributed fiber optic sensing (DFOS)/distributed acoustic sensing (DAS) systems, methods, and structures exhibiting a sensitivity enhancement via MIMO sampling and phase recombination.

3 Claims, 12 Drawing Sheets

DISTRIBUTED ACOUSTIC SENSING SENSITIVITY ENHANCEMENT USING MIMO SAMPLING AND PHASE RECOMBINATION

CROSS REFERENCE

This application claims the benefit of U.S. Provisional Patent Application Ser. No. 63/256,002 filed 15 Oct. 2021 the entire contents of which is incorporated by reference as if set forth at length herein.

TECHNICAL FIELD

This disclosure relates generally to distributed fiber optic sensing (DFOS) systems, methods, and structures and more particularly to distributed acoustic sensing (DAS) sensitivity enhancement using MIMO sampling and phase recombination.

BACKGROUND

Distributive acoustic sensing (DAS) is an optical fiber sensing technology that allows an interrogator to detect vibrations and acoustic signals remotely, along an entire length of an installed fiber optic cable. DAS can advantageously be applied in a wide range of applications such as infrastructure monitoring, oil-and-gas operations, and earthquake detection—among others. Operationally, DAS employs Rayleigh scattering effects in an optical fiber to detect changes in the dynamic strain in localized fiber segments.

One important characteristic of a DAS system is its sensitivity, namely the lowest dynamic strain that it can detect at any given fiber segment. When measured at short distances, a DAS system's sensitivity is typically on the order of several to several tens of pico-epsilon per square-root Hertz ($p\varepsilon/\sqrt{Hz}$).

Current DAS systems exhibit an interrogation repetition rate limitation, which is determined by a round-trip time required to interrogate a given fiber optic cable length. As a result, the Nyquist bandwidth of the "acoustic" sampling rate is much lower than the optical signal bandwidth.

Within an interrogation signal, there are a combination of noise sources that affect system operation such as laser phase noise and additive white Gaussian noise (AWGN). Without a sufficient acoustic sampling rate, the system noise outside of the acoustic Nyquist band cannot be removed and will be "folded back" into a received acoustic band, raising the phase noise floor of the retrieved DAS signal. As current commercial DAS systems have a sampling rate mismatch between optical and acoustic sampling of more than 100 times, the strain sensitivity of current DAS system can be several orders of magnitude off, when compared to discrete phase interferometers without distributive operation.

Given such characteristics, improvements in DFOS sensitivity would represent a welcome addition to the art.

SUMMARY

An advance in the art is made according to aspects of the present disclosure directed to DFOS systems, methods, and structures and more particularly to distributed acoustic sensing (DAS) sensitivity enhancements using MIMO sampling and phase recombination.

In sharp contrast to the prior art, systems, methods, and structures according to aspects of the present disclosure provides enhanced DAS sensitivity via massive MIMO sampling and phase recombination and mitigates extra noise folding back to recovered DAS phase signals due to a sampling rate mismatch. Advantageously, by using multiple channels along the same path for DAS interrogation with synchronization, systems and methods according to the present disclosure obtain time-offset DAS results of each channel using MIMO detection. The multi-channel DAS results can then be recombined in DSP to yield a single-phase signal stream exhibiting a higher fidelity due to suppression of out-of-band laser phase noise and additive white gaussian noise (AWGN).

As we shall show and describe our inventive systems and methods according to the present disclosure enhance DAS sensitivity through MIMO interrogation and DSP implemented channel recombination for the MIMO DAS implementation.

Viewed from a first aspect, our inventive systems and methods employ one of two methods namely, a time-interleaved method or a time-alignment method. The time-interleaved method employed in the present disclosure is used to increase the acoustic sampling rate to suppress out-of-band laser phase noise and AWGN. The time alignment method, which accounts for a time offset between the samples of different DAS MIMO channels, applies a corresponding phase shift before recombining the phase signals digitally. Advantageously, the resulting DAS output has the native acoustic sampling rate of each channel as well as the same sensitivity enhancement as the time-interleaved method including being more robust to Rayleigh fading.

Yet another aspect of systems and methods according to aspects of the present disclosure involves how the MIMO interrogation is performed using multiple frequency channels. Advantageously, it is not limited to implementation in optical frequencies and provides an elegant way to provide such functionality, as the transmitter and receiver hardware can be shared among different channels. In frequency domain DAS MIMO, interrogation pulse/code using multiple frequencies may be sent out in a time staggered fashion to achieve higher acoustic sampling rate thereby allowing noise suppression after DSP recombination.

BRIEF DESCRIPTION OF THE DRAWING

A more complete understanding of the present disclosure may be realized by reference to the accompanying drawing in which:

FIG. 4(A) and FIG. 4(B) illustrate algorithms to combine multiple DAS results for out-of-band noise suppression in which.

FIG. 5(A) and FIG. 5(B) are plots illustrating DAS sensitivity improvement via higher acoustic sampling rate in which: FIG. 5(A) is a low acoustic sampling rate.

FIG. 6(A), FIG. 6(B), and FIG. 6(C) are plots showing illustrative sampled receiver spectra for FDM MIMO DAS in which.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGS. comprising the drawing are not drawn to scale.

By way of some additional background, we begin by noting that distributed fiber optic sensing (DFOS) is an important and widely used technology to detect environmental conditions (such as temperature, vibration, acoustic excitation vibration, stretch level etc.) anywhere along an optical fiber cable that in turn is connected to an interrogator. As is known, contemporary interrogators are systems that generate an input signal to the fiber and detects/analyzes the reflected/scattered and subsequently received signal(s). The signals are analyzed, and an output is generated which is indicative of the environmental conditions encountered along the length of the fiber. The signal(s) so received may result from reflections in the fiber, such as Raman backscattering, Rayleigh backscattering, and Brillion backscattering. DFOS can also employ a signal of forward direction that uses speed differences of multiple modes. Without losing generality, the following description assumes reflected signal though the same approaches can be applied to forwarded signal as well.

Figure 1A:
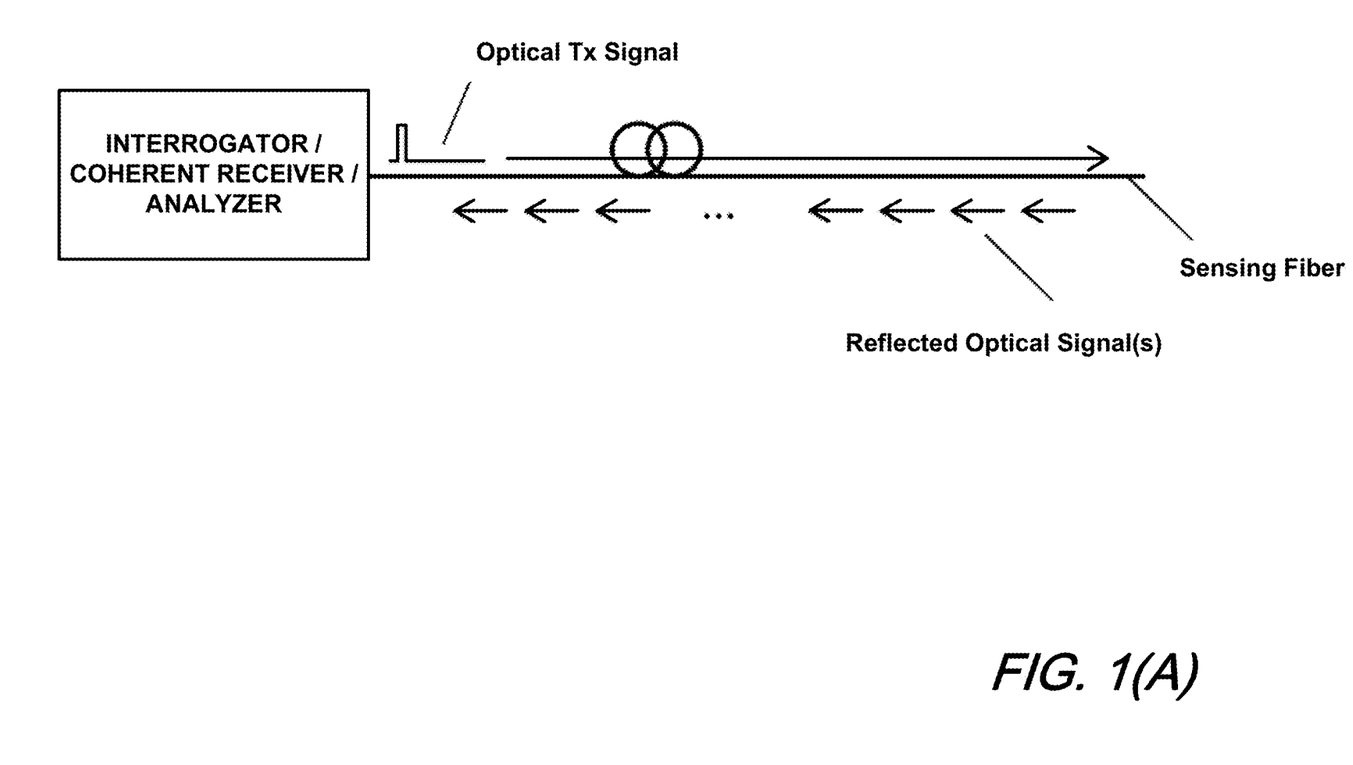
FIG. 1(A) is a schematic diagram illustrating a DFOS system according to aspects of the present disclosure.

FIG. 1(A) is a schematic diagram of a generalized, prior-art DFOS system. As will be appreciated, a contemporary DFOS system includes an interrogator that periodically generates optical pulses (or any coded signal) and injects them into an optical fiber. The injected optical pulse signal is conveyed along the optical fiber.

Figure 1B:
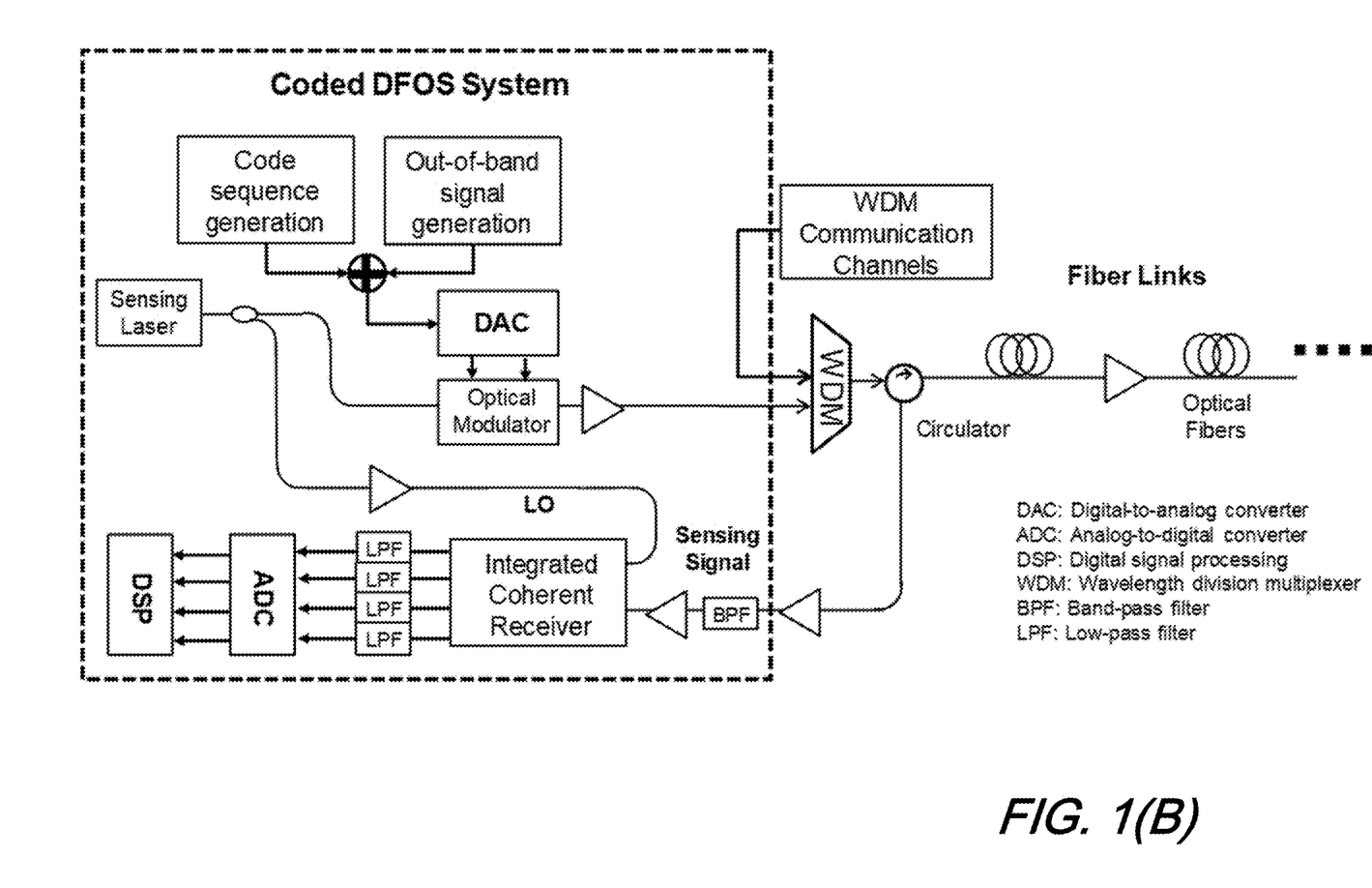
FIG. 1(B) is a schematic diagram illustrating a coded constant-amplitude DFOS system with out-of-band signal generation according to aspects of the present disclosure.

At locations along the length of the fiber, a small portion of signal is reflected and conveyed back to the interrogator. The reflected signal carries information the interrogator uses to detect, such as a power level change that indicates—for example—a mechanical vibration. While not shown in detail, the interrogator may include a coded DFOS system that may employ a coherent receiver arrangement known in the art such as that illustrated in FIG. 1(B).

The reflected signal is converted to electrical domain and processed inside the interrogator. Based on the pulse injection time and the time signal is detected, the interrogator determines at which location along the fiber the signal is coming from, thus able to sense the activity of each location along the fiber.

Those skilled in the art will understand and appreciate that by implementing a signal coding on the interrogation signal enables the sending of more optical power into the fiber which can advantageously improve signal-to-noise ratio (SNR) of Rayleigh-scattering based system (e.g. distributed acoustic sensing or DAS) and Brillouin-scattering based system (e.g. Brillouin optical time domain reflectometry or BOTDR).

As currently implemented in many contemporary implementations, dedicated fibers are assigned to DFOS systems in fiber-optic cables—physically separated from existing optical communication signals which are conveyed in different fiber(s). However, given the explosively growing bandwidth demands, it is becoming much more difficult to economically operate and maintain optical fibers for DFOS operations only. Consequently, there exists an increasing interest to integrate communications systems and sensing systems on a common fiber that may be part of a larger, multi-fiber cable.

Operationally, we assume that the DFOS system will be Rayleigh-scattering based system (e.g., distributed acoustic sensing or DAS) and Brillouin-scattering based system (e.g., Brillouin optical time domain reflectometry or BOTDR) with a coding implementation. With such coding designs, these systems will be most likely be integrated with fiber communication systems due to their lower power operation and will also be more affected by the optical amplifier response time.

With this discussion in place, we again note that systems, methods and structures according to aspects of the present disclosure advantageously mitigate extra noise folding back to recovered DAS phase signals due to the aforementioned sampling rate mismatch. By using multiple channels along same path for DAS interrogation with synchronization, our systems and methods obtain time-offset DAS results of each channel using MIMO detection. The multi-channel DAS results can then be recombined in DSP to yield a single-phase signal stream having a higher fidelity due to suppression of out-of-band laser phase noise and AWGN. While using multiple channels for DAS operation to increase the effective acoustic sampling rate for sensing interrogation has been proposed before, a focus of this disclosure is the implementation on how to enhance the DAS sensitivity through MIMO interrogation and its channel recombination method in DSP.

As we have noted, our inventive systems and methods employ one of two methods namely, a time-interleaved method and a time-alignment method. The time-interleaved method was used in the prior art to increase an effective sampling rate of multiple channel DAS, but according to the present disclosure we employ this method to increase the acoustic sampling rate to suppress out-of-band laser phase noise and AWGN. The time alignment method, which accounts for the time offset between the samples of different DAS MIMO channels, applies a corresponding phase shift before recombining the phase signals digitally. The resulted DAS output has the native acoustic sampling rate of each channel but also achieves the same sensitivity enhancement as the time-interleaved method. Furthermore, the time-alignment method is more robust to Rayleigh fading.

Yet another feature of systems and methods according to the present disclosure concerns MIMO interrogation being performed using multiple frequency channels. Not only is it not limited to implementation in optical frequencies, but as it turns out it is one of the simplest way to realize functionality, as the transmitter and receiver hardware can be shared among different channels. Note that in frequency domain DAS MIMO, interrogation pulse/code using multiple frequencies are sent out in a time staggered fashion, to achieve higher acoustic sampling rate thereby allowing noise suppression after DSP recombination.

As we now note again, one important benefit of our inventive MIMO DAS technique according to the present disclosure is the resulting increase in acoustic sampling rate of the DAS system for a given fiber cable route, while suppressing out-of-band noise to improve DAS sensitivity.

Figure 2:
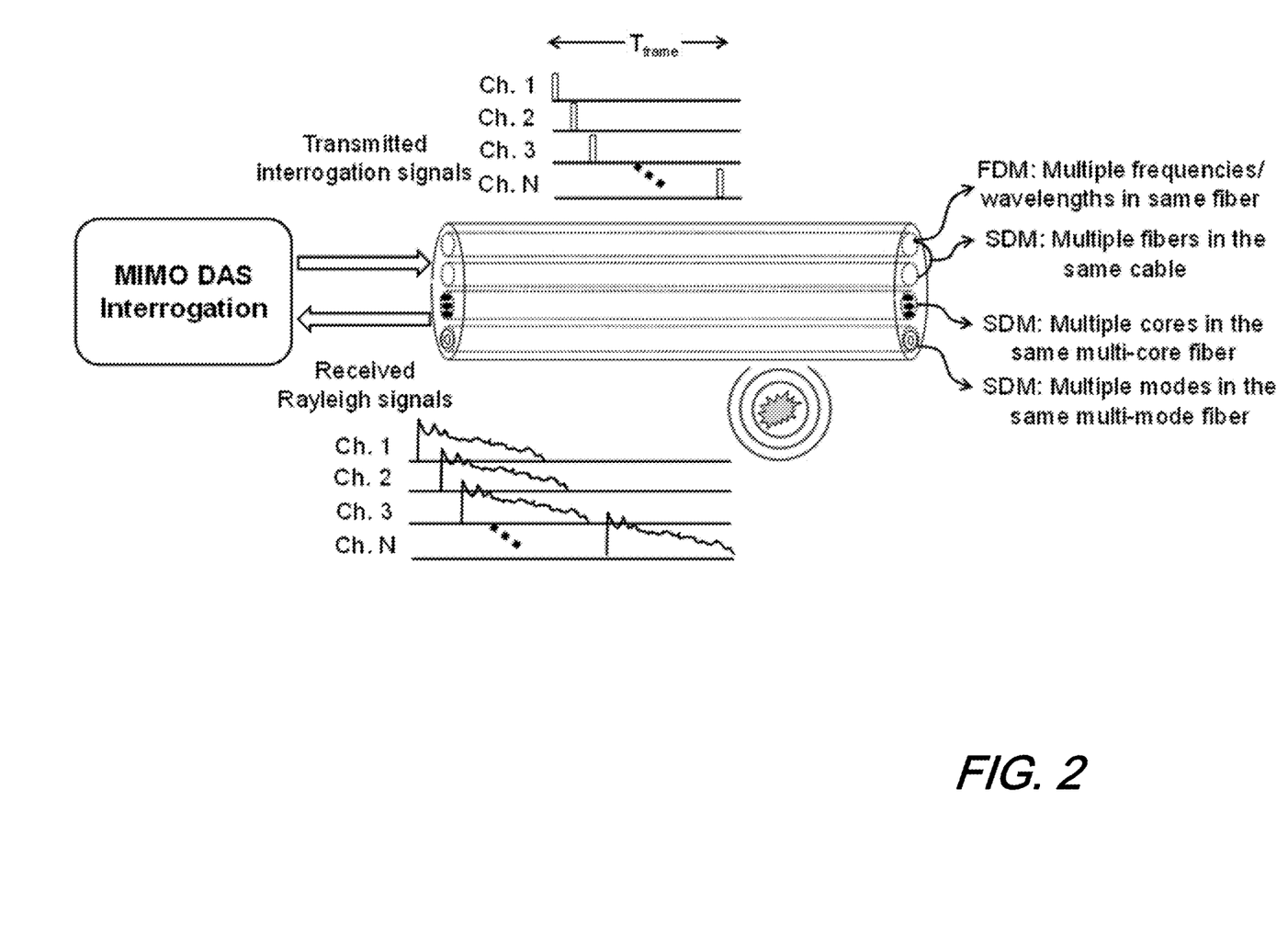
FIG. 2 is a schematic diagram showing an illustrative a MIMO DAS architecture arrangement with staggered interrogation signals according to aspects of the present disclosure.

FIG. 2 is a schematic diagram showing an illustrative MIMO DAS architecture arrangement with staggered interrogation signals according to aspects of the present disclosure. As compared to a single channel DAS, this scheme illustrated in the figure will interrogate on multiple channels, with each channel sending interrogation pulse/sequence and receiving Rayleigh signals on a native channel interrogation period of $T_{frame}$. The interrogation signals on different channels, however, are staggered in time by a small fraction of $T_{frame}$. Therefore, after MIMO detection and processing, the DAS signal information at different channels can be combined together to yield a phase signal output that exhibits a lower phase noise floor and suppressed of out-of-band noise.

As schematically shown in the figure, there are multiple methods to achieve MIMO DAS within an optical fiber cable. Perhaps the simplest method is to implement via FDM, wherein multiple frequency/wavelength channels are used. In this case only 1 fiber is required, and the optical/electronic hardware can be shared among multiple channels.

Figure 3:
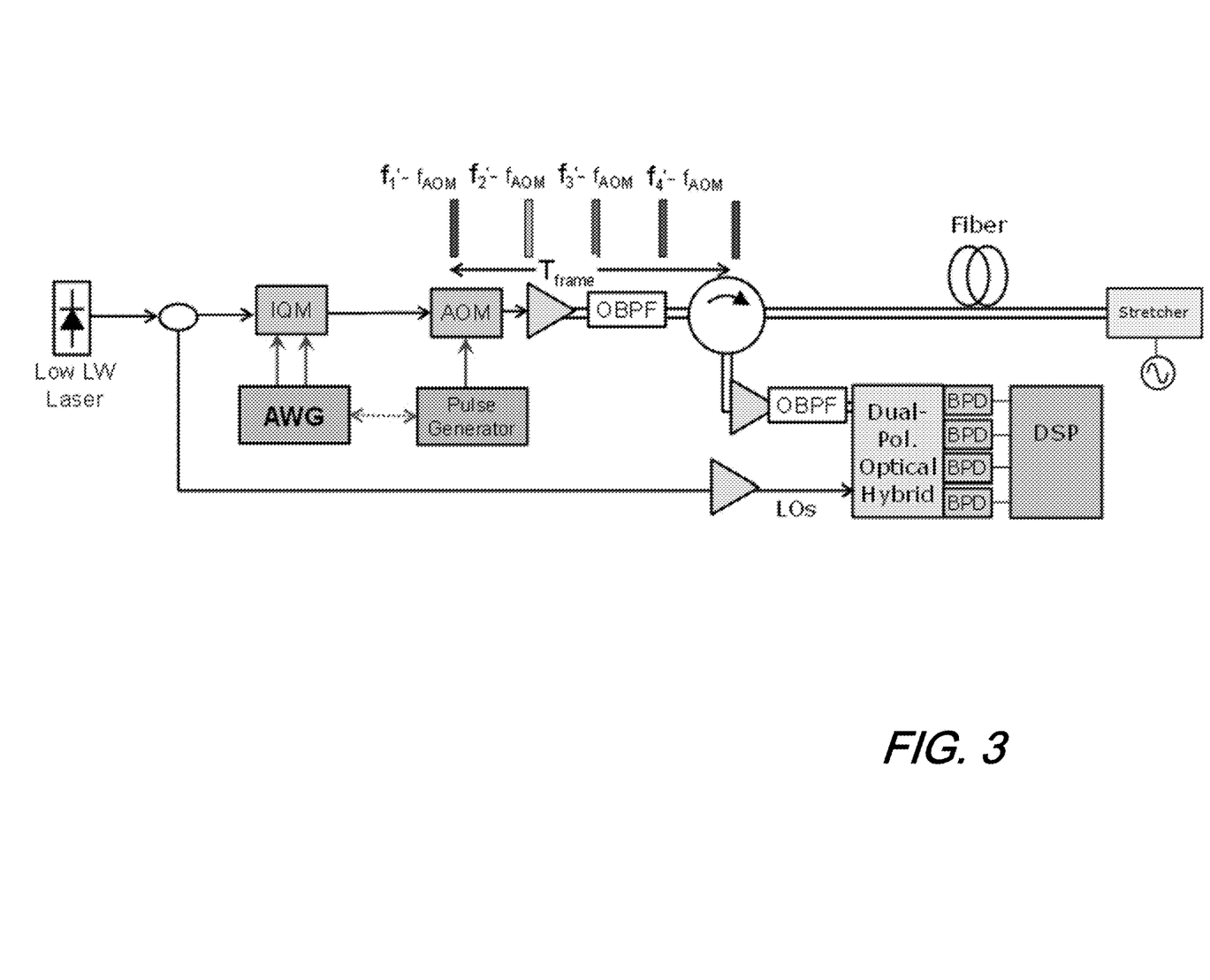
FIG. 3 is a schematic diagram showing an illustrative MIMO DAS implemented using a single TX/RX/FDM configuration according to aspects of the present disclosure.

It can also be performed via space division multiplexing (SDM), either by using different fibers, different cores within a multicore fiber (MCF), or different modes within a multimode fiber (MMF). With SDM, typically multiple sets of optical/electronic hardware are required as they typically can't be shared among channels. Also, if it is done in MCF or MMF, spatial multiplexing and demultiplexing is also necessary FIG. 3 is a schematic diagram showing an illustrative MIMO DAS implemented using a single TX/RX/FDM configuration according to aspects of the present disclosure. In this figure, an illustrative FDM DAS setup is shown to demonstrate how MIMO DAS can be implemented using a single transmitter and receiver setup. The setup exhibits a major difference in interrogation signal generation as compared to the prior art. According to aspects of the present disclosure, our inventive scheme utilizes time staggering between different frequency-channels to increase the effective acoustic sampling rate. With the native frame period of $T_{frame}$ for each separate channel, the interrogation pulses or sequences of each channel are purposely offset in time. Thus, the time offset between adjacent channels will be $T_{frame}/N$ in an N-channel MIMO DAS system, with the effective acoustic sampling rate increased by N times.

Advantageously, in this particular implementation of FDM DAS, the MIMO interrogation signals for all channels can be generated together using a single transmitter. First, the sensing laser is modulated by an in-phase/quadrature modulator (IQM) to generate multiple frequencies in successive fashion, before the optical pulses at each frequency is generated via an acoustic-optical modulator (AOM). The modulation signals to the modulators can be generated from a typical DAC or arbitrary waveform generator. It should be noted that the implementation is not limited to just pulse interrogation, as sequence/code can also be generated for each channel using this configuration if desired.

At the receiver, the Rayleigh reflected signals from each channel can be detected by a single coherent receiver without de-multiplexing. For DSP operation, each FDM channel is first filtered and down converted to baseband digitally, before it is passed on to the main DAS algorithm for parallel processing. For every location (defined by the system's spatial resolution) of each frequency channel, a differential phase value is produced by an algorithm.

Figure 4A:
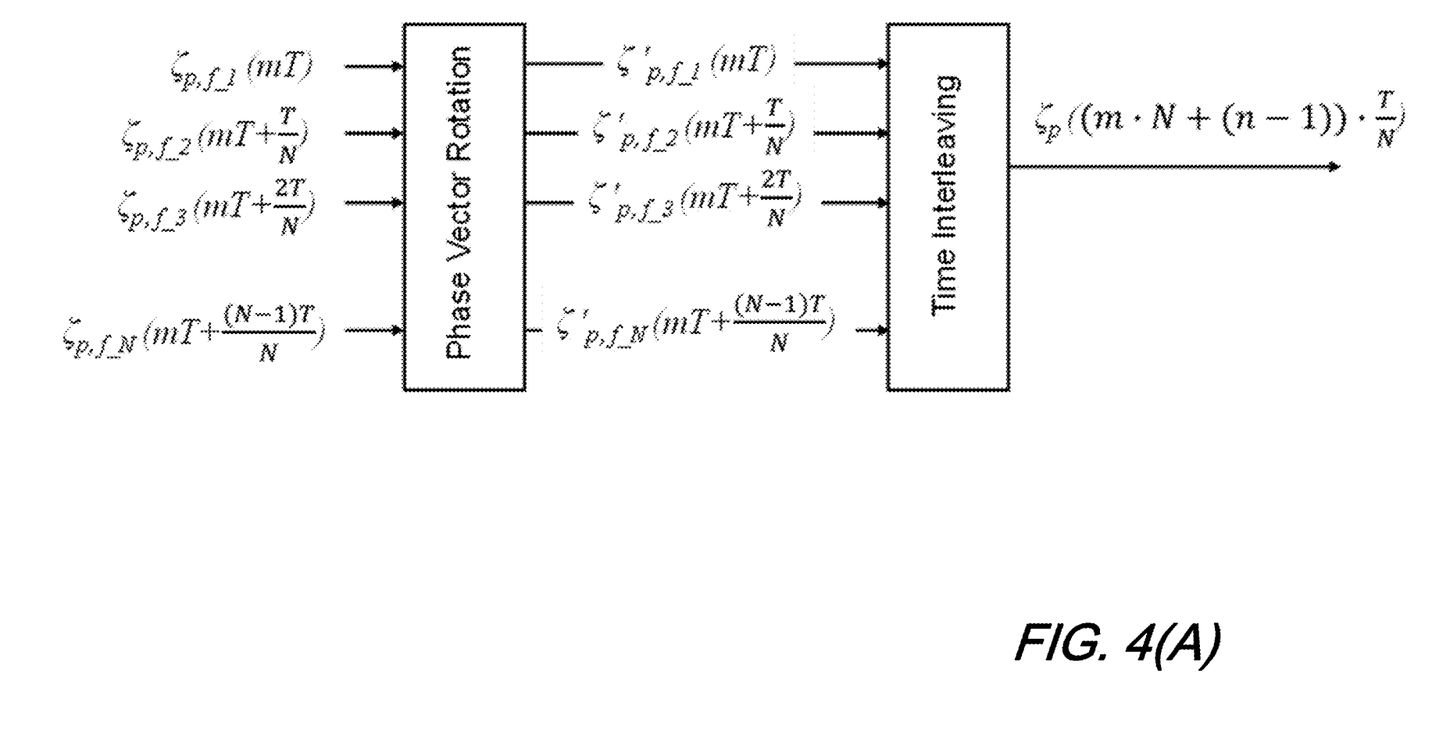
FIG. 4(A) is a time interleaving method.
Figure 4B:
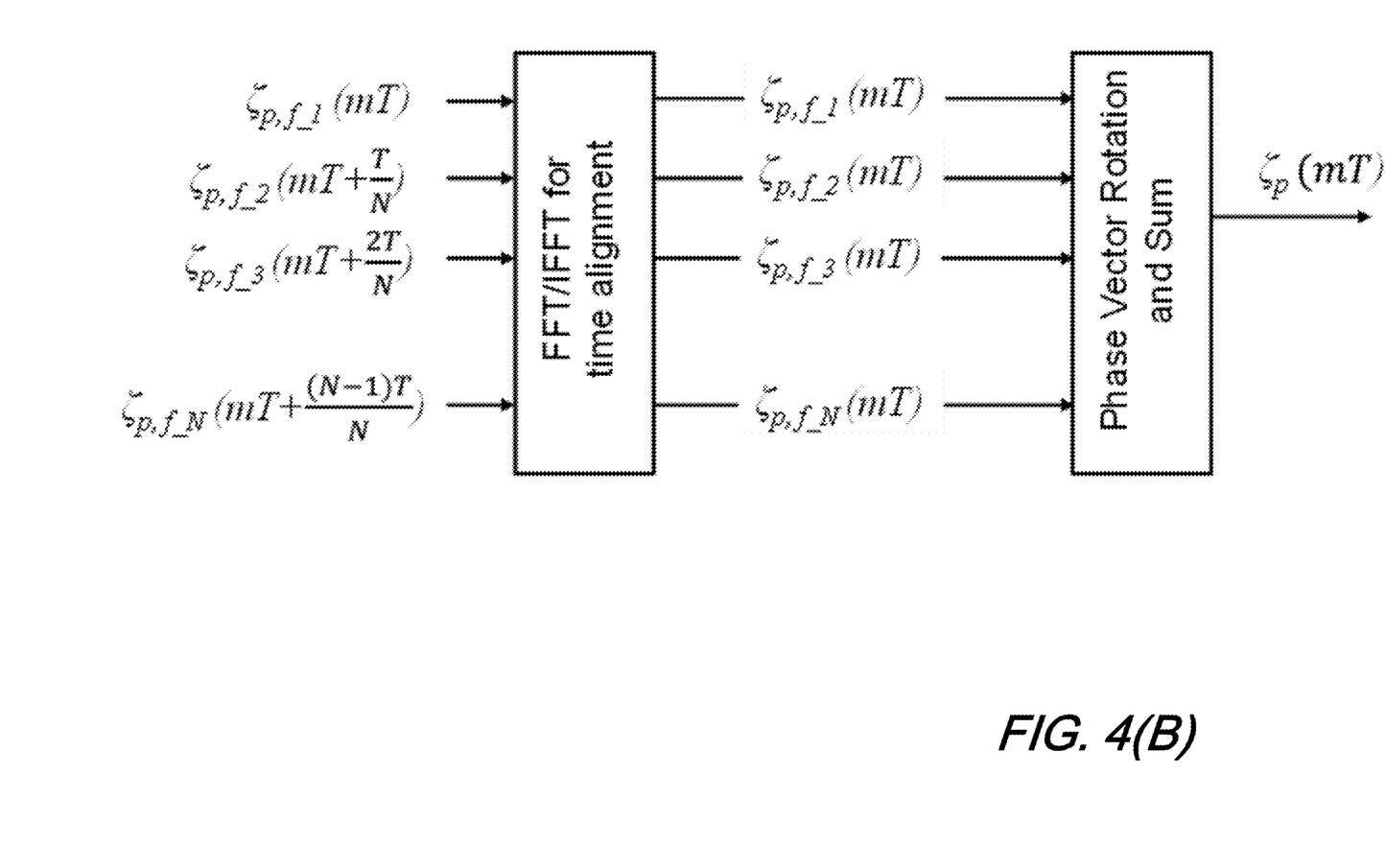
FIG. 4(B) is a time alignment method according to aspects of the present disclosure.

As we have noted, our inventive systems and methods according to the present disclosure employ two ways to combine DAS phase results into a single stream from different channels of MIMO DAS, and they are depicted in FIG. 4(A) and FIG. 4(B) in which FIG. 4 (A) and FIG. 4(B) illustrate algorithms to combine multiple DAS results for out-of-band noise suppression in which: FIG. 4(A) is a time interleaving method, and FIG. 4(B) is a time alignment method according to aspects of the present disclosure.

Note that both algorithms deal with the combination of multiple phase tributaries at the same fiber location. As noted, the first method is the time interleaving method, where N channels with individual native sampling rate of 1/T are stitched together to form higher sampling rate of N/T. Before the time interleaving, the phase vectors from each channel are rotated to prevent introduction of additional interleaving noise. This can be done by an LPF-based combining algorithm.

The second method via time alignment addresses the timing offset of each individual channel, and brings them together so each contributing samples are aligned in time. To align each channels, FFT and IFFT are performed on each channels to multiply the corresponding phase coefficients of exp $$\left(-j\cdot 2\pi\frac{(n-1)T}{N}f\right).$$

After time alignment, the same phase vector rotating algorithm can be used before the phase results from each channels are summed. Note that the final DAS phase output sampling rate is the same as the native sampling of each individual channel.

Figure 5A:
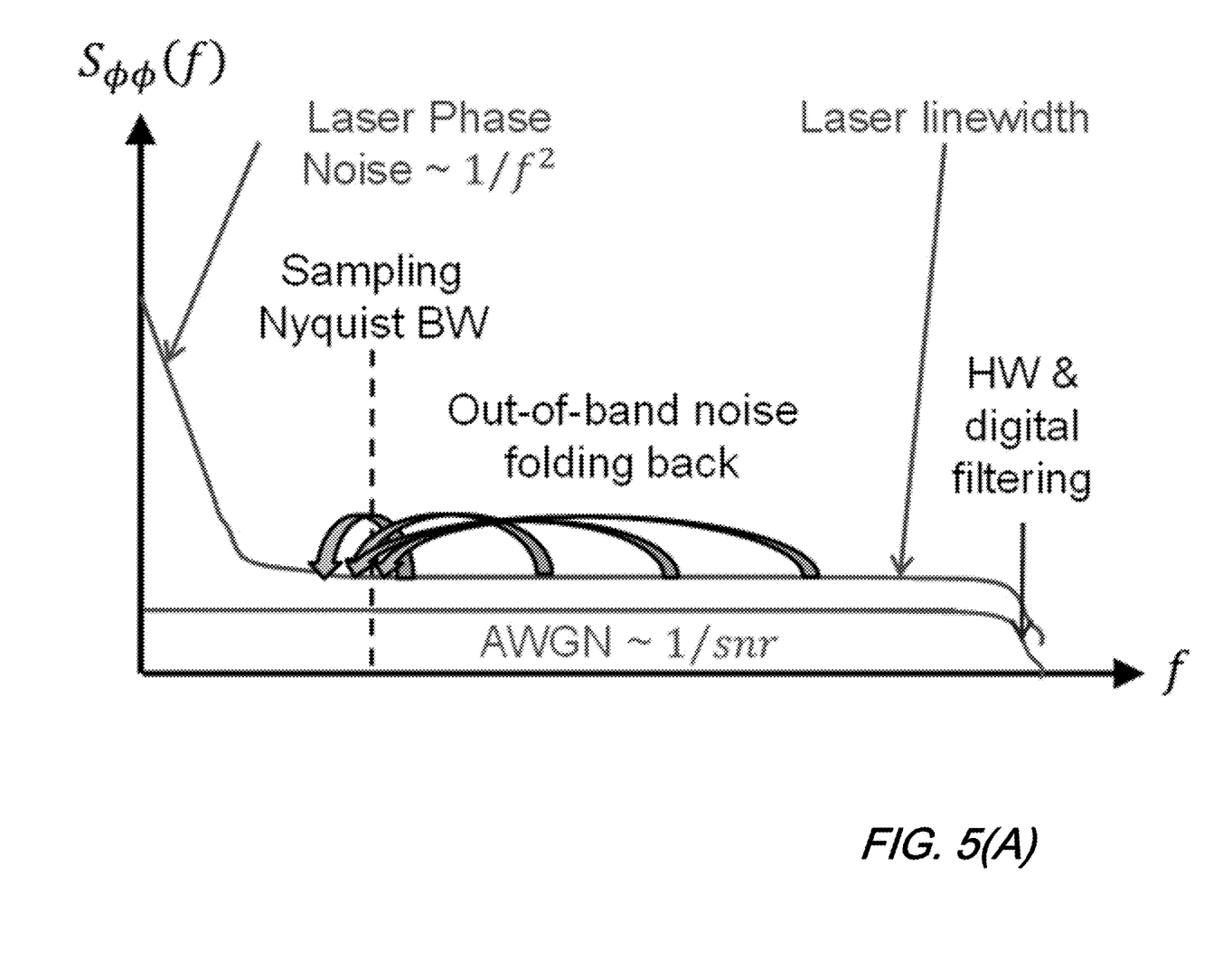
Figure 5B:
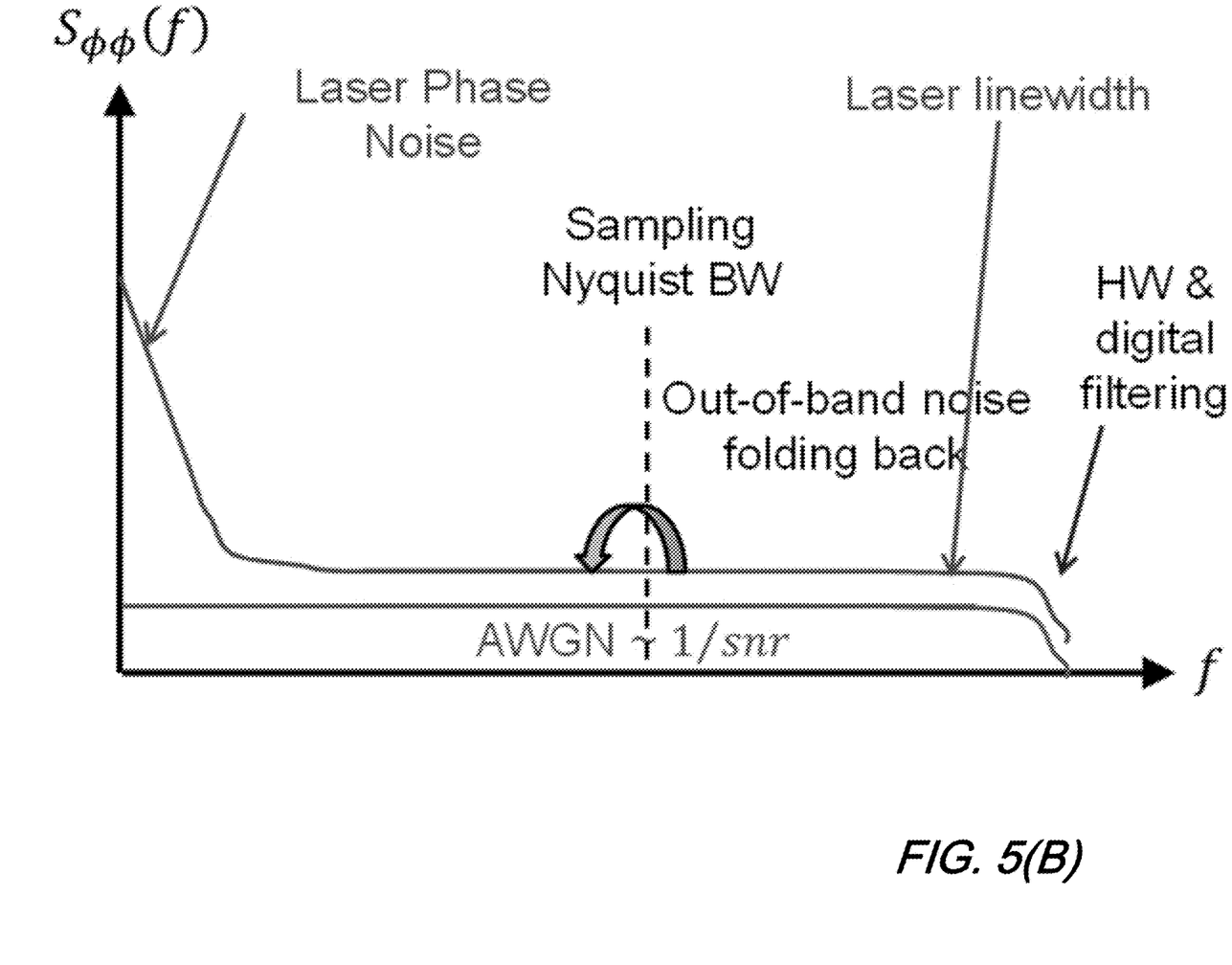
FIG. 5(B) is a high acoustic sampling rate according to aspects of the present disclosure.

FIG. 5 (A) and FIG. 5(B) are plots illustrating DAS sensitivity improvement via higher acoustic sampling rate in which: FIG. 5(A) is a low acoustic sampling rate, and FIG. 5(B) is a high acoustic sampling rate according to aspects of the present disclosure. In these figures, we illustrate the fundamental principle that explains how higher acoustic sampling rate can enhance DAS strain sensitivity. In a DAS interrogation system, both the laser phase noise and the additive white Gaussian noise (AWGN) will contribute to the eventual DAS phase noise, limiting the sensitivity performance.

For ease of discussion, we focus on short distance DAS operation regime where laser phase noise is the dominant noise source. At frequency below 10~100 Hz, the laser phase noise is much higher due to limitation of mechanical and temperature isolation of the laser module, as shown in FIG. 5(B). It gradually decreases to a stable level corresponding to the native linewidth of the laser.

Note that laser phase noise is intrinsic to the DAS interrogation operation and can only be partially filtered by the receiver hardware LPF and digital filter in DSP. The bandwidth of these filters are typically designed in accordance to the DAS spatial resolution requirement, and are therefore much wider than the acoustic sampling bandwidth, which is limited by interrogation round trip time. Thus, even with relative high repetition rate at short distance, there will still be much of the phase noise present outside of the Nyquist bandwidth which cannot be properly filtered, causing them to fold back into DAS acoustic bandwidth and raise the phase noise floor significantly. For example, with ~10-kHz repetition rate (for 10-km distance) and ~10 MHz signal filtering (for 10-m spatial resolution), there will be roughly 30-dB increase of noise level due to insufficient acoustic sampling rate.

With our inventive systems and methods according to the present disclosure, the acoustic sampling rate can be effectively increased by the MIMO DAS interrogation. With higher sampling rate, as was shown in FIG. 5(B), the amount of noise presented outside of the Nyquist band will be effectively less, and the in-band phase noise floor will be reduced as there are less noise being folded back. Therefore, it should be noted that the MIMO DAS implementation according to the present disclosure does not aim to achieve a wider DAS bandwidth for high frequency signal detection and identification, but to suppress the in-band phase noise via higher acoustic sampling rate.

Hypothetically, if 100×MIMO was performed on the aforementioned DAS system with 10-kHZ repetition rate, the phase noise can be suppressed by 20-dB in theory.

One can also view how the noise floor gets suppressed by examining the operations illustrated in FIG. 4(A) and FIG. 4(B). For the time interleaving method, the detected DAS phase can be expressed as follows:

$$\zeta_{p,f_1}(mT) = \zeta_{p,\varepsilon}(mT) + \zeta_{p,laser}(mT) + \zeta_{p,AWGN_1}(mT)$$

$$\zeta_{p,f_2}\left(mT + \frac{T}{N}\right) = \zeta_{p,\varepsilon}\left(mT + \frac{T}{N}\right) + \zeta_{p,laser}\left(mT + \frac{T}{N}\right) + \zeta_{p,AWGN_2}\left(mT + \frac{T}{N}\right)$$

$$\zeta_{p,f_3}\left(mT + \frac{2T}{N}\right) =$$

$$\zeta_{p,\varepsilon}\left(mT + \frac{2T}{N}\right) + \zeta_{p,laser}\left(mT + \frac{2T}{N}\right) + \zeta_{p,AWGN_3}\left(mT + \frac{2T}{N}\right)$$

$$\zeta_{p,f_N}\left(mT + \frac{(N-1)T}{N}\right) = \zeta_{p,\varepsilon}\left(mT + \frac{(N-1)T}{N}\right) +$$

$$\zeta_{p,laser}\left(mT + \frac{(N-1)T}{N}\right) + \zeta_{p,AWGN_N}\left(mT + \frac{(N-1)T}{N}\right).$$

The time interleaved result becomes: (k=m·N+n−1)

$$\zeta_{p,int}\left(k \cdot \frac{T}{N}\right) = \zeta_{p,\varepsilon}\left(k \cdot \frac{T}{N}\right) + \zeta_{p,laser}\left(k \cdot \frac{T}{N}\right) + \sum_{n=1}^{N} \zeta_{p,AWGN_n}\left(k \cdot \frac{T}{N}\right),$$

$$n = k \bmod N + 1$$

As the final results indicates, we have effectively increased the sampling rate for both the strain signal $\zeta_{p,\varepsilon}$ and the accompanying laser phase noise $\zeta_{p,laser}$ by N times. Assuming the intrinsic phase noise has much larger bandwidth as indicated in FIG. 5(A) and FIG. 5(B), the noise level will can be effectively reduced by oversampling. Assuming each channel has similar AWGN level, then the third term can be written as $$\zeta_{p,AWGN_{avg}}\left(k \cdot \frac{T}{N}\right),$$

where it can be seen as a single AWGN with averaged noise level being sampled N times higher. Using the same argument as the laser phase noise, the effective DAS phase noise floor caused by AWGN will be suppressed with higher sampling rate.

In the time-alignment method, the DSP operation can be described as follows:

$$\zeta_{p,f_1}(mT) = \zeta_{p,\varepsilon}(mT) + \zeta_{p,laser_{IB}}(mT) + \zeta_{p,laser_{OOB}}(mT) + \zeta_{p,AWGN_1}(mT)$$

$$\zeta_{p,f_2}(mT) =$$

$$\zeta_{p,\varepsilon}(mT) + \zeta_{p,laser_{IB}}(mT) + \zeta_{p,laser_{OOB}}\left(mT + \frac{T}{N}\right) + \zeta_{p,AWGN_2}\left(mT + \frac{T}{N}\right)$$

$$\zeta_{p,f_3}(mT) =$$

$$\zeta_{p,\varepsilon}(mT) + \zeta_{p,laser_{IB}}(mT) + \zeta_{p,laser_{OOB}}\left(mT + \frac{2T}{N}\right) + \zeta_{p,AWGN_3}\left(mT + \frac{2T}{N}\right)$$

$$\zeta_{p,f_N}(mT) = \zeta_{p,\varepsilon}(mT) + \zeta_{p,laser_{IB}}(mT) +$$

$$\zeta_{p,laser_{OOB}}\left(mT + \frac{(N-1)T}{N}\right) + \zeta_{p,AWGN_N}\left(mT + \frac{(N-1)T}{N}\right)$$

The final time interleaved results becomes:

$$\zeta_p(mT) = \zeta_{p,\varepsilon}(mT) + \zeta_{p,laser_{IB}}(mT) +$$

$$\frac{1}{N}\sum_{n=1}^{N} \zeta_{p,laser_{OOB}}\left(mT + \frac{(N-1)T}{N}\right) + \frac{1}{N}\sum_{n=1}^{N} \zeta_{p,AWGN_n}\left(mT + \frac{(N-1)T}{N}\right)$$

The first two terms of the result, $\zeta_{p,\varepsilon}$ and $\zeta_{p,laser_{IB}}$, indicates that we get the same phase results at the same sampling rate from all the tributaries for the strain signal and the laser phase noise that is in the acoustic bandwidth. The last two summation terms take into account of the different out-of-band laser phase noise and AWGN from different channels. For out-of-band laser phase noise, since they reside outside of the frequency region where they can be aligned via FFT/IFFT, the noise strength will add up incoherently. The same is for AWGN noise as they are from contributed different channels. Assuming similar AWGN levels, we obtain:

$$\zeta_p(mT) \cong$$

$$\zeta_{p,\varepsilon}(mT) + \zeta_{p,laser_{IB}}(mT) + \frac{1}{\sqrt{N}}\zeta_{p,laser_{OOB}}(mT) + \frac{1}{\sqrt{N}}\zeta_{p,AWGN_{avg}}(mT)$$

From the above equation, it can be understood that if the single channel DAS is dominated by out-of-band laser phase noise and AWGN, using MIMO-DAS with N channels can suppress the noise level by N times via the time-alignment method.

We conducted several experiments based on the concepts described to confirm the suppression of phase noise using MIMO-DAS. The baseline single channel DAS using commercially available sensing laser can achieve ~2-pε/$\sqrt{Hz}$ strain sensitivity (~0.25-mrad/$\sqrt{Hz}$), operating at 20-kHz repetition rate (5-km distance) and 10-MHz filter bandwidth (10-m resolution)

Figure 6A:
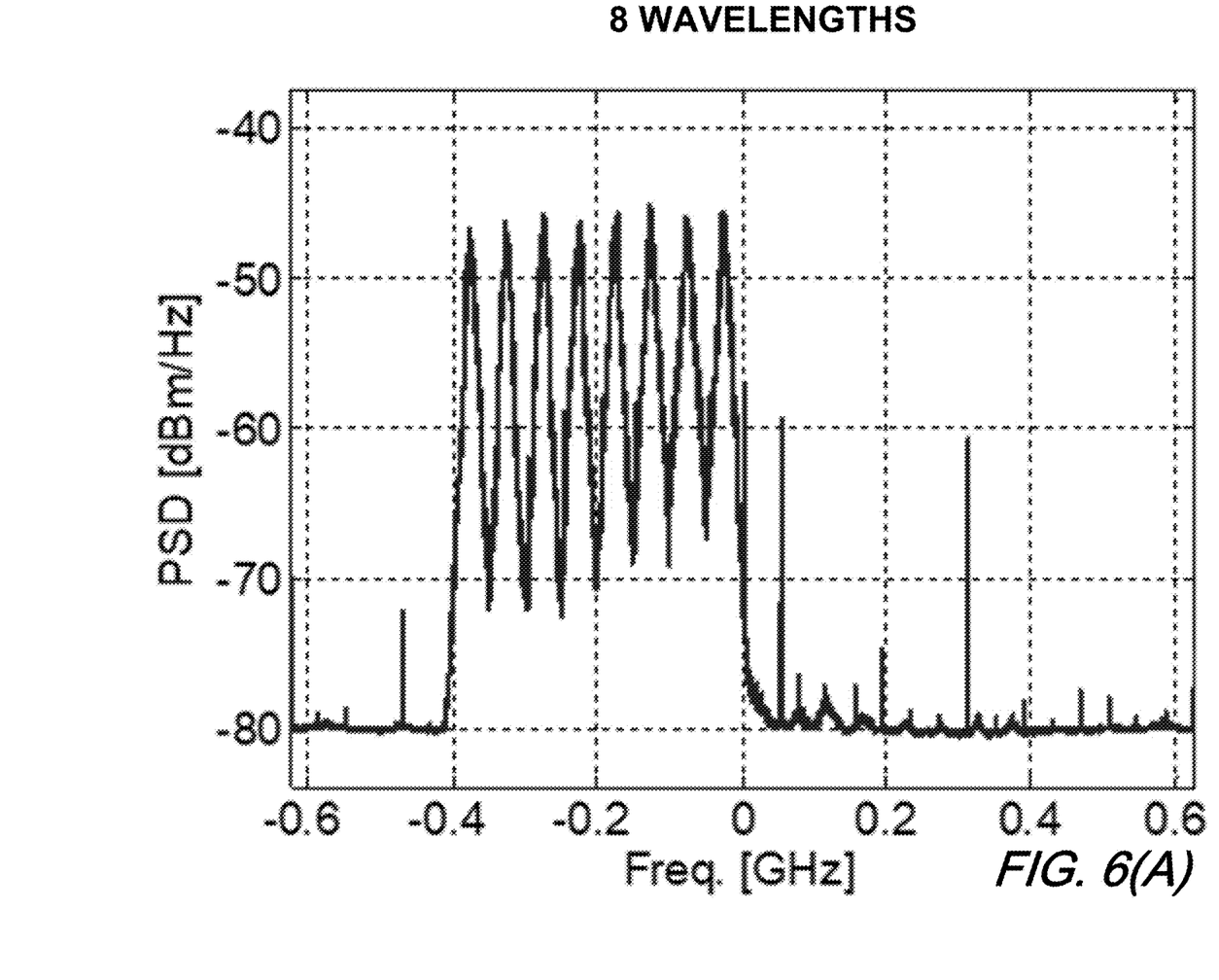
FIG. 6(A) is for 8 wavelengths.
Figure 6B:
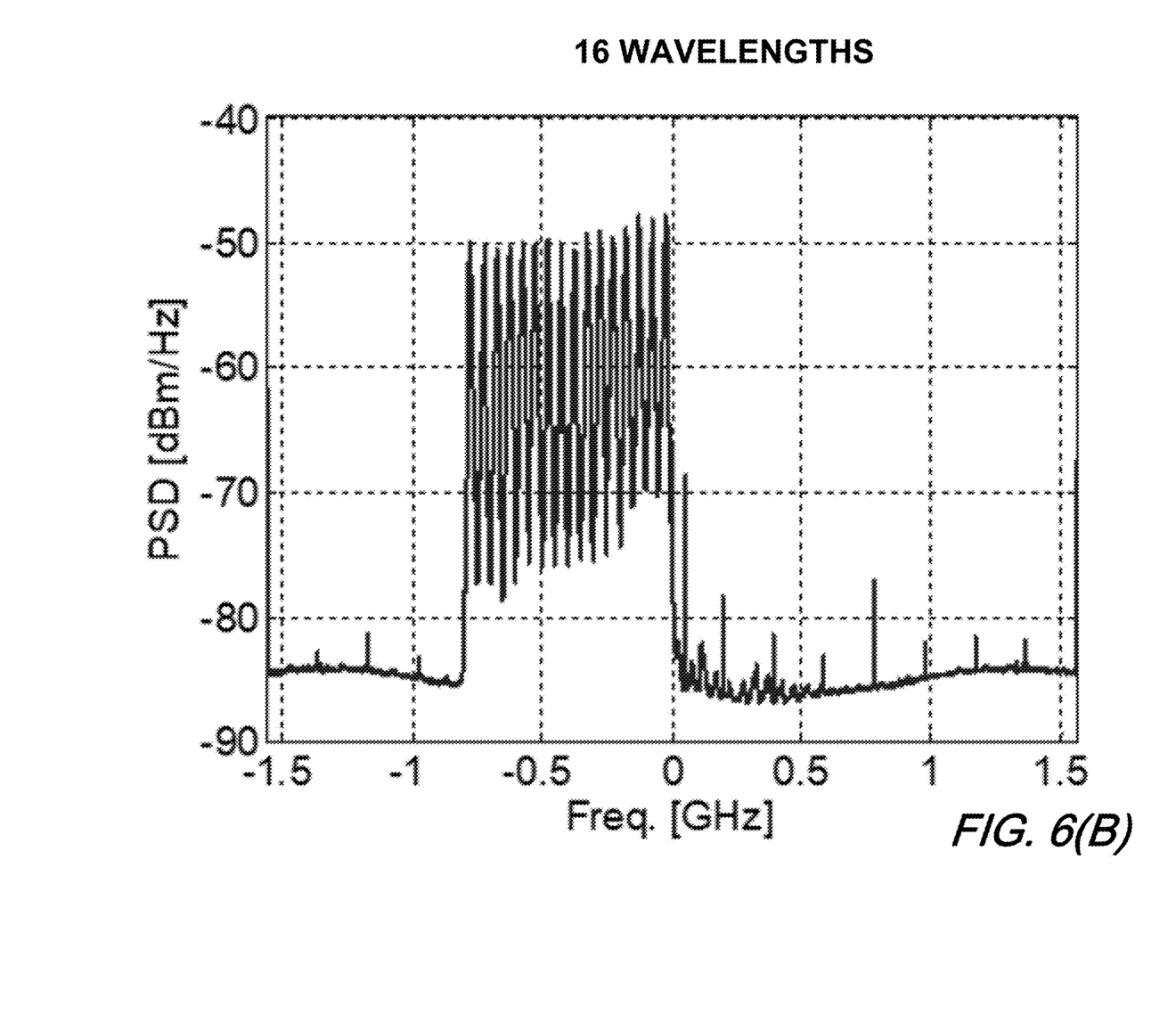
FIG. 6(B) is for 16 wavelengths.
Figure 6C:
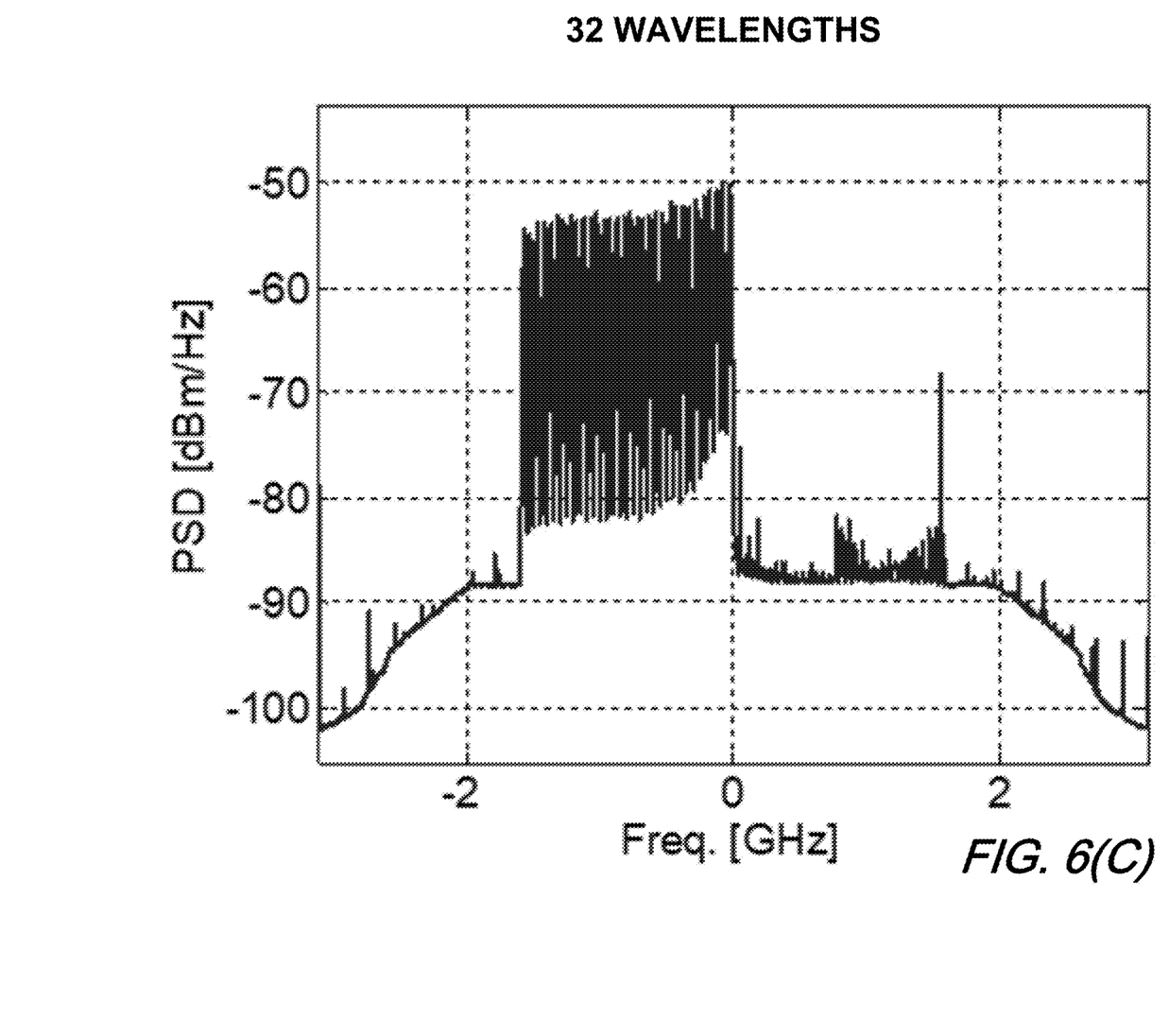
FIG. 6(C) is for 32 wavelengths according to aspects of the present disclosure.

FDM DAS was implemented to achieve MIMO-DAS as shown in FIG. 3. A total of 8, 16, and 32 frequency channels are generated using an AWG with 50-MHz spacing and 40-ns pulse carving as illustrated in FIG. 6(A), FIG. 6(B), and FIG. 6(C), in which FIG. 6(A), FIG. 6(B), and FIG. 6(C) are plots showing illustrative sampled receiver spectra for FDM MIMO DAS in which: FIG. 6(A) is for 8 wavelengths, FIG. 6(B) is for 16 wavelengths, and FIG. 6(C) is for 32 wavelengths according to aspects of the present disclosure.

Single-side-band (SSB) signal modulation and detection is used to avoid penalties from I/Q imbalance from the transmitter and receiver. The DAS signal for each channel is processed separately in DSP before they are combined using the two proposed methods.

We have determined the results of FDM DAS using time alignment method with 8 frequencies, in spectrogram, phase plot, and phase spectrum. The output DAS results has the same sampling rate of 20-kHz. From these results, a location of the PZT can be identified, with the stretch signal of a 1.267-kHz 0.16-rad signal being clearly seen. Examining the phase spectrum, we found that the 8-frequency system obtain a noise floor level of ~0.1-mrad/$\sqrt{Hz}$, roughly 8× improvement compared to single frequency DAS.

In another experiment, time interleaving method was used to construct the final DAS results. Due to time interleaving, the final acoustic sampling rate is 160-kHz. In result plots, the stretcher location and applied signal can also be retrieved, even though the phase plot contains more noise as compared to time alignment experiments due to more wider band noise present (which can be removed via further digital filtering). Upon examining the phase spectrum, the noise level was found to be similar to the time-alignment method. However, it should be noted that on the spectrogram, there are additional interleaving noises being added by this method.

Figure 7:
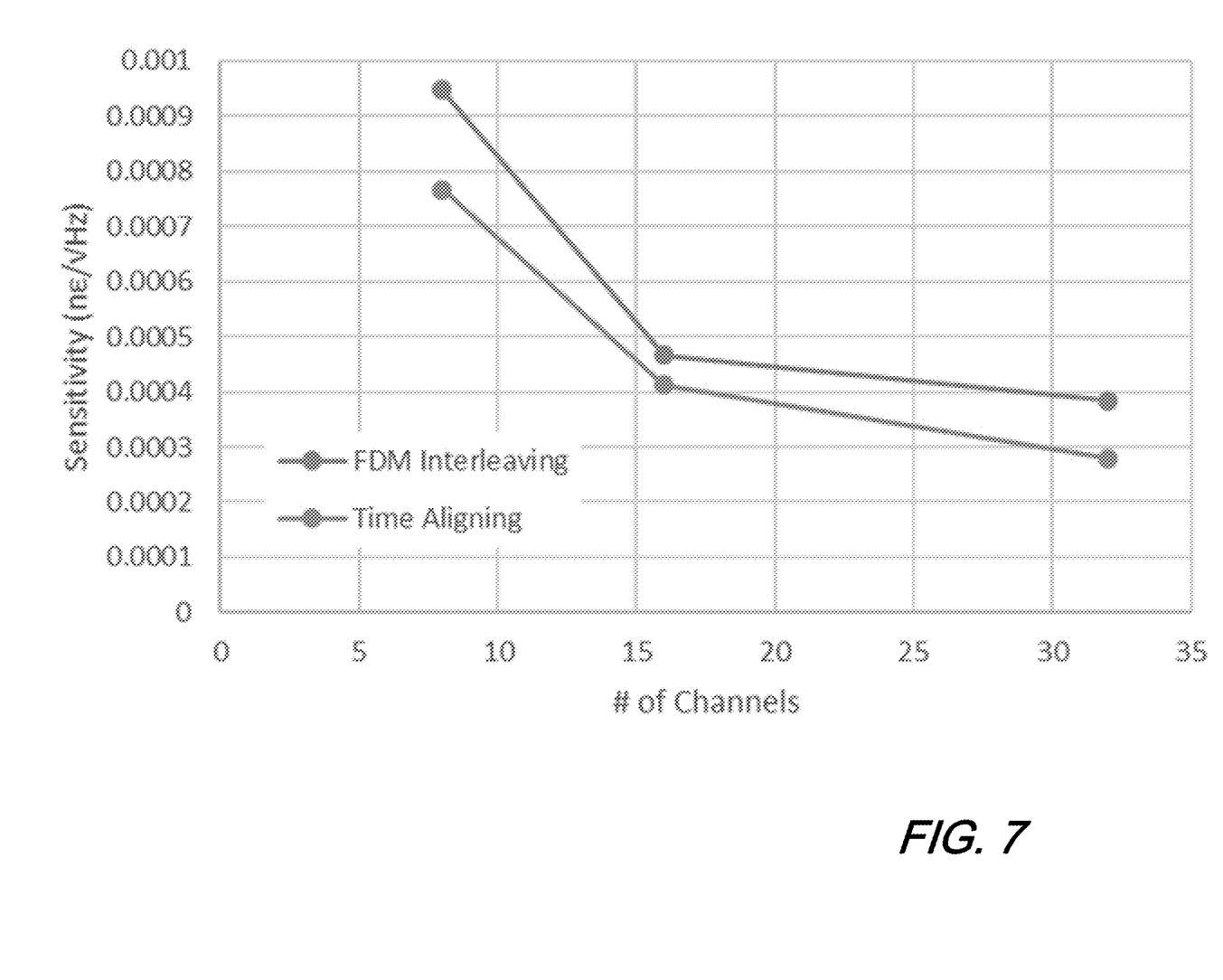
FIG. 7 is a plot showing illustrative average DAS sensitivity using massive FDM MIMO according to aspects of the present disclosure.

FIG. 7 is a plot showing illustrative average DAS sensitivity using massive FDM MIMO according to aspects of the present disclosure. In this figure, we compare the MIMO-DAS performance using the two different combining methods. It is found that the time alignment method does achieve better performance than the time-interleaving method. The reason behind the performance difference is likely due to Rayleigh fading. As each frequency channel will have a different Rayleigh response, there are bound to be channels that have significantly worse SNR than the average. With time-interleaving, the combined results will be more susceptible to fading as one bad channel can affect the overall performance. The time-alignment method, on the other hand, uses the phase average of all channels to suppress phase noise and can mitigate fading through averaging as well. With each frequency channel sampling at 20-kHz (5-km test spools), a record-low 0.3 pε/$\sqrt{Hz}$ can be achieved using 32 channels, using a total TX/RX bandwidth of ~2-GHz. The only downside of the time-alignment method is its lower output acoustic bandwidth.

We note that our two combining methods can also be used together in successive fashion. So instead of time interleaving or aligning all the channels, time alignment can be done first to neighboring channels to mitigate fading first for better phase noise performance, with time-interleaving performed later to detect higher frequency acoustic signals. This will provide a more gradual trade-off curve between the phase noise performance and output acoustic bandwidth.

Lastly, the massive MIMO DAS can also be used in conjunction with coded DAS at long distances when AWGN is the main noise source. As a result, the interrogation pulse shown in FIG. 3 will be replaced by code sequences to enhance the optical SNR of each individual DAS channel.

At this point, while we have presented this disclosure using some specific examples, those skilled in the art will recognize that our teachings are not so limited. Accordingly, this disclosure should only be limited by the scope of the claims attached hereto.

The invention claimed is:

1. A method for distributed fiber optic sensing/distributed acoustic sensing (DFOS/DAS) using Multiple-Input Multiple-Output MIMO sampling and phase combination comprising:
   providing a multiple-channel DFOS/DAS system including:
      length of optical fiber sensor cable;
      a multiple-channel DFOS/DAS interrogator in optical communication with the length of optical fiber sensor cable;
      an intelligent analyzer configured to analyze multiple-channel DFOS/DAS sensing data received by the multiple-channel DFOS/DAS interrogator;
   operating the multi-channel DFOS/DAS interrogator according to a time-staggered MIMO DAS interrogation scheme that interrogates optical fiber sensor cable on multiple channels and receive Rayleigh reflected signals from the optical fiber sensor cable for the multiple channels; and
   combining the received Rayleigh reflected signals for the multiple channels into a single-phase signal output stream exhibiting desirable phase noise characteristics including suppression of out-of-band laser phase noise and additive white Gaussian noise (AWGN);
   multiple channels comprise multiple frequency division multiplexed, frequency/wavelength channels;
   wherein the received Rayleigh signals are received at a channel interrogation period of $T_{frame}$;
   wherein interrogation signals produced by the interrogator are staggered in time for each of the channels by a fraction of $T_{frame}$;
   wherein the interrogation signals are introduced into one of: i) multiple fibers configured in a same cable, or ii) multiple modes in a same multi-mode fiber; and
   wherein the received Rayligh reflected signals for the multiple channels are combined into a single-phase signal output stream by one of: i) a time interleaving method, where N channels with individual sampling rate of 1/T are stitched together to form a higher sampling rate of N/T, and ii) a time alignment method that adjusts a timing offset of each individual channel and combines them together such that each contributing samples are aligned in time by performing a Fast Fourier Transform and Inverse Fourier Transform on each channel.

2. The method of claim 1 wherein a time offset between adjacent channels is $T_{frame}/N$ where N is the number of channels in the multiple channel DFOS/DAS MIMO operation.

3. The method of claim 2 wherein the multiple channel DFOS/DAS interrogator includes a single transmitter and receiver configuration (single transmit/receive/frequency division multiplexing TX/RX FDM).

\* \* \* \* \*